Jan. 1, 1952
H. M. McFADDEN
2,581,197
HYDRAULICALLY CONTROLLED ADJUSTABLE BACK
REST FOR SEATS AND CHAIRS
Filed Sept. 24, 1947
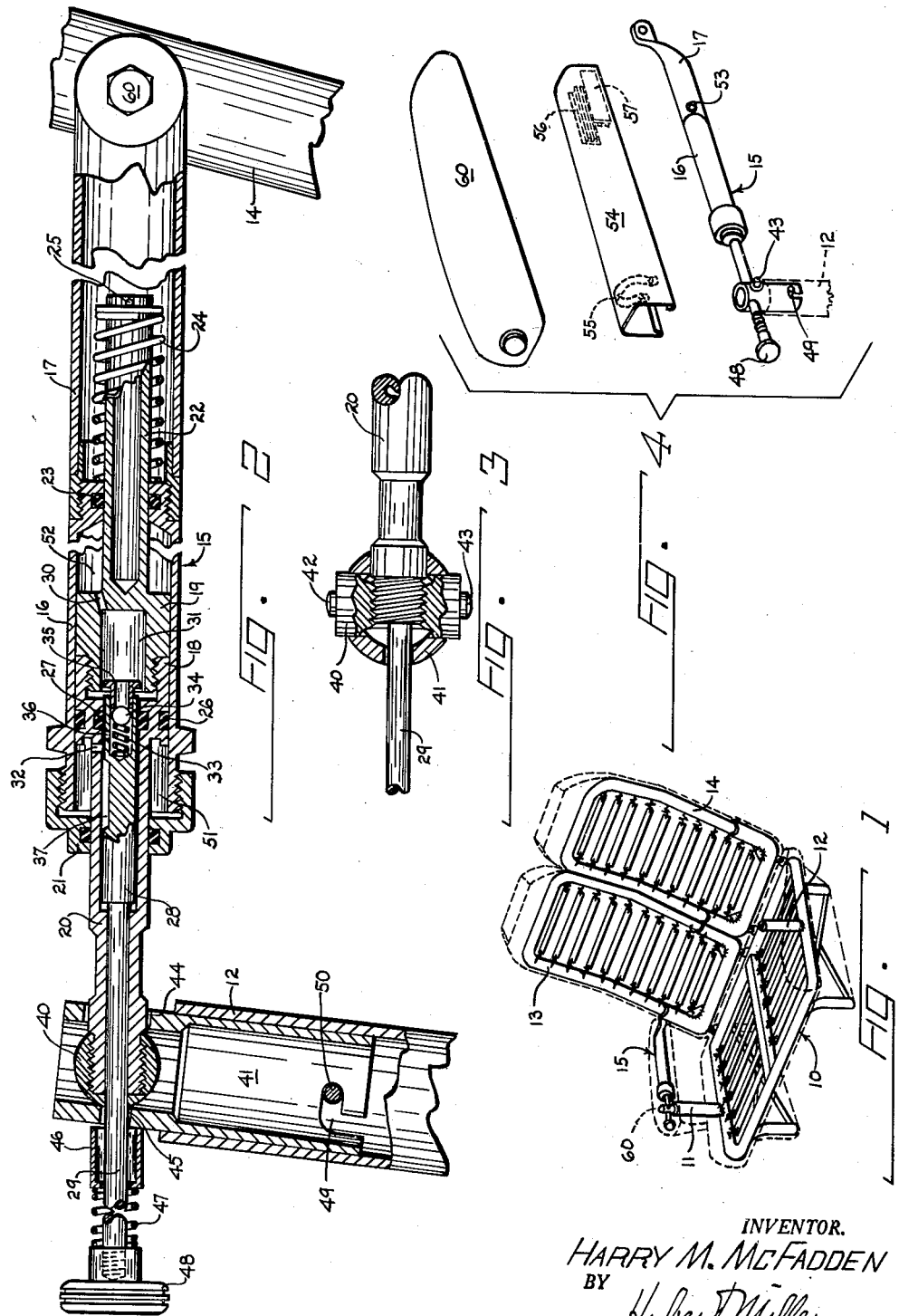
INVENTOR.
HARRY M. McFADDEN
BY
Hubert Miller
ATTORNEY.

Patented Jan. 1, 1952

2,581,197

UNITED STATES PATENT OFFICE 2,581,197

HYDRAULICALLY CONTROLLED ADJUSTABLE BACK REST FOR SEATS AND CHAIRS

Harry M. McFadden, Wichita, Kans., assignor to Boeing Airplane Company, Wichita, Kans.

Application September 24, 1947, Serial No. 775,851

4 Claims. (Cl. 155—159)

1

This invention relates to seats and chairs having adjustable back rests, and to hydraulic means for controlling the adjustment of the back rests.

I am fully aware that hydraulic means have previously been used to control the adjustment of seat back rests, but no one has to my knowledge produced a hydraulic control mechanism which is equivalent to my invention, nor has anyone mounted and connected such a mechanism to the seat in the manner contemplated by the present invention.

It is generally agreed among the manufacturers of seats with adjustable backs that the most practical and convenient location for the element which actually controls the back rest holding mechanism is on the arm of the seat. Heretofore, the location of this control element on the seat arm has necessitated a complicated linkage for transmitting control element movement from the seat arm to the actual back rest holding mechanism, which has always been located beneath or within the seat bottom. This location of the holding mechanism has also created difficulties in that the back rest is usually hinged at its lower end to the seat, and an extension of the back rest below the hinge point has ordinarily been required to allow the holding mechanism proper leverage for back rest control.

These and other difficulties are obviated by my invention which, briefly, involves the location of a new type hydraulic back rest holding mechanism inside the arm of the seat, and in using the mechanism itself to connect the stationary portion of the seat to the adjustable back rest. Such location also permits the user operated control element to be located conveniently at the forward end of the seat arm, and eliminates the necessity of complicated linkage between the control element proper and the back rest holding mechanism.

It is a primary object of the invention, then, to provide an improved construction and arrangement of components for a seat or chair having a user controlled adjustable back rest.

It is another object to provide a seat of this type in which the back rest holding mechanism and the user operated control element therefor are assembled as a single unit housed by the seat arm.

It is a further object to provide a unit of this type which may be removed from the seat for repair or replacement by the prior removal of a single stud connecting the unit to the back rest.

It is still a further object of the invention to provide a novel hydraulic mechanism for hold-

2 ing a seat back rest in any desired angle of inclination with relation to the seat bottom.

Another object is to provide a hydraulic mechanism of this type which will automatically return the seat back to a neutral position after the user leaves the seat, thus providing identical angles of inclination for grouped unoccupied seats or chairs.

These and other objects of the invention will be clearly understood when the following description is read in connection with the accompanying drawings, which are provided for illustrative purposes only, and in which:

Figure 1 is a perspective view of a vehicle seat constructed in accordance with one embodiment of this invention.

Figure 2 is a side elevation, partly in vertical section, showing the details of construction of a hydraulic back rest holding mechanism constructed in accordance with the invention, and also showing its manner of attachment to parts of the seat;

Figure 3 is a fragmentary view of certain parts of the mechanism illustrated in Figure 1, some parts being shown in section; and Figure 4 is an exploded perspective view of the hydraulic back rest holding mechanism and the two parts of its housing, which together form a unitary seat arm.

Figure 1 illustrates one embodiment of the invention. It will be understood that the invention is capable of embodiment in various types of seats and chairs, although the seat chosen for illustration is of the aircraft type. Its frame structure comprises a seat base or bottom 10 which includes two rigid upright arm supports 11 and 12 located at its opposite sides, and two rigid back rest frames 13 and 14, the lower ends of which are respectively hinged to the seat bottom, as shown, to permit the back rest to tilt.

The hydraulic units 15, which serve to hold the individual back rests at various desired angles of inclination with relation to the seat bottom are illustrated in Figures 2, 3, and 4. Referring to Figure 2, such a hydraulic unit includes a housing the major portion of which is in the form of a cylinder 16.

The remaining portion 17 of this housing attaches to the cylinder, as shown, and is suitably shaped to facilitate the pivotal attachment of its free end to the seat back, the end being shown curved, flattened, and perforated in this instance, to receive a pivot pin or bolt 60, which anchors to the back rest.

The cylinder 16 houses a piston made up of two threadedly connected parts 18 and 19. The piston section 18 includes a concentric tubular valve stem housing 20 which also serves as a piston rod. A packing gland 21 closes one end of the cylinder and permits reciprocation of the piston rod 20 without loss of hydraulic fluid from the cylinder.

The piston section 19 is provided with a concentric tubular guide 22 which reciprocates through a packing gland 23 at the opposite end of the cylinder, and which carries a coil spring 24 bearing against a pin 25. This spring normally urges the piston toward the inner end of the cylinder—a movement which shortens the overall assembly, and moves the seat back forward, as will be later understood.

The piston section 18 carries a packing ring 26 which seals against the cylinder wall, and an internal packing ring 27 which seals against the outer surface of a reciprocable valve 28, which has a stem 29 which projects from the end of the hollow piston rod 20. The piston is provided with open by-pass passages 30 and 31, and a valve controlled fluid flow passage 32. As will be seen, the inner end of the valve 28 has a short central bore which houses a spring 33 bearing against a ball 34 to normally keep the ball seated on a valve seat insert 35. The cylindrical valve 28 is slightly smaller in diameter than the bore of the piston rod in which the valve reciprocates, but the sealing ring 27 seals closely about the valve. A perforation 36 affords communication between the space surrounding the valve and the bore in its end. The outer surface of this valve is provided with one or more longitudinally disposed grooves 37 which permit hydraulic fluid to flow beneath the sealing ring when the valve moves into the passage 31 in the piston, the complete operation being explained more fully hereinafter.

The means of mounting the forward end of this hydraulic assembly on the seat includes a trunnion 40 the ends of which are rotatably mounted in the upper end of a post 41, and terminate in projecting pins 42 and 43. Intermediate its ends the trunnion is cross bored and threadly receives the outer end of the piston rod 20, which passes through an oversized perforation 44 in the wall of the post 41. An oppositely positioned oversized perforation 45 in the post wall loosely receives the valve stem 29. Mounted on the valve stem 29 outside the post 41 is a spacer 46, a spring 47, and a knob or valve operating button 48, the spring serving to normally urge the valve toward a closed position, as shown in Figure 1. The oversized perforations 44 and 45 permit the piston and cylinder assembly to pivot slightly about the trunnion 40 during adjustment of the seat back.

At is lower end the post 41 is provided with oppositely positioned goose neck slots 49 which cooperate with a cross pin 50 carried internally by the arm supports 11 and 12 near their upper ends, to removably anchor each post within the upper end of its upright. A slight turn of the entire assembly allows removal of the post 41 from its arm support.

*Operation*

Assuming the chambers 51 and 52, the flow passages 30, 31, and 32, and the bore in the inner end of the valve 28 to be filled with hydraulic fluid, the pressure of spring 24 would gradually force liquid through valve 34, through port 36 into the space surrounding the valve 28, and into the chamber 51 through the port 32. This would result in the piston slowly approaching the gland 23, and in an overall shortening of the entire assembly. This in turn would cause the seat back to assume a more upright position. If the invention was installed on grouped seats as in a bus, railroad car, or the like, the back rests of all unoccupied seats would thus present a uniform appearance.

With the back rest in its farthest forward position, a seat occupant who wishes to increase the angle of inclination of the back rest simply pushes inward on the button 48. The valve 28 is thus moved partially into the chamber 31, and the groove 37 passes beneath the sealing ring 27. A slight rearward pressure on the back rest then causes liquid to flow from chamber 51 through port 32 into the space surrounding the valve 28, through the groove 37 beneath the sealing ring 27, and directly into the chamber 31. During this fluid flow the back rest is permitted to pivot rearward. When the back rest has assumed the desired position, the seat occupant releases the knob, and the valve 28 is returned to the position shown in Figure 1, stopping all fluid flow from chamber 51 into chamber 31. The normal pressure of the occupant's back on the back rest is greater than the pressure of spring 24, and this hydraulic unit thus holds the back rest in the set position.

By leaning forward in the seat and pressing the knob 48, fluid is allowed to flow quickly from chamber 31 into chamber 51 under the urgence of spring 24, and the back rest quickly assumes its full forward position.

As a means of housing the unit within the upholstered arm rest 60 of a seat, I utilize the pins 42 and 43 which projects from the opposite ends of the trunnion 40, and two identical pins 53 suitably mounted on the housing section 17, and projecting outwardly therefrom in a substantially horizontal plane. A shell 54, open along its bottom and at its ends, carries an internally mounted spring clip 55 the two free ends of which are perforated, as shown, to receive the pins 42 and 43 of the trunnion 40. Near its rear end the shell is provided with internally mounted guide brackets 56 and 57, which are provided with facing substantially horizontal grooves which slidably receive the pins 53. The arm rest padding and its outer fabric covering are mounted directly on the shell 54, so that it forms a unitary removable housing for the back rest holding unit. The aft end of the arm rest is simply placed over the unit 15, and the pins 53 slide into the grooves in the brackets 56 and 57. The ends of the spring clip 55 are then sprung outwardly until the pins 42 and 43 enter the perforations. The arm is thus anchored in proper position, yet it does not in any way interfere with the movement of the cylinder 16 as the hydraulic unit 15 elongates. The pins 53 simply move along the grooves in the guide brackets.

Having described the invention with sufficient clarity to enable those familiar with the art to construct, assemble, and use it, I claim:

1. A seat comprising in combination: A supported seat base; an arm support rigidly connected to the base and having a socket therein; a back rest pivotally connected to the seat base; an extensible hydraulic piston and cylinder unit for controlling the tilting of the back rest; a post pivotally connected to one end of said unit and adapted to seat removably in the socket of the arm support; removable means pivotally connecting the other end of said unit to the back rest; and means for controlling the elongation and contraction of the unit.

2. The organization described in claim 1, and a removable arm rest housing said hydraulic unit.

3. The invention described in claim 1 and a hollow arm rest removably housing the hydraulic unit and supported thereby independent of any contact with the seat proper.

4. The invention described in claim 1 in which the said means for controlling the elongation and contraction of the hydraulic unit is in the form of an outwardly spring pressed reciprocable rod which projects forwardly through said post.

HARRY M. McFADDEN.

REFERENCES CITED

The following references are of record in the file of this patent:

UNITED STATES PATENTS

| Number | Name | Date |
| --- | --- | --- |
| 85,481 | Schmitt | Dec. 29, 1868 |
| 1,950,226 | Cable | Mar. 6, 1934 |
| 1,970,480 | Wood | Aug. 14, 1934 |
| 1,991,676 | Huwyler | Feb. 19, 1935 |
| 2,090,311 | Saltman | Aug. 17, 1937 |
| 2,201,261 | Frey | May 21, 1940 |
| 2,248,487 | Booth | July 8, 1941 |
| 2,354,889 | Smith | Aug. 1, 1944 |
| 2,419,412 | McArthur | Apr. 22, 1947 |

FOREIGN PATENTS

| Number | Country | Date |
| --- | --- | --- |
| 268,840 | Germany | Feb. 14, 1913 |